May 29, 1962 J. A. FORESTIERE 3,036,894
METHOD OF USING TESTING CONTAINERS
Filed Oct. 22, 1958 3 Sheets-Sheet 1
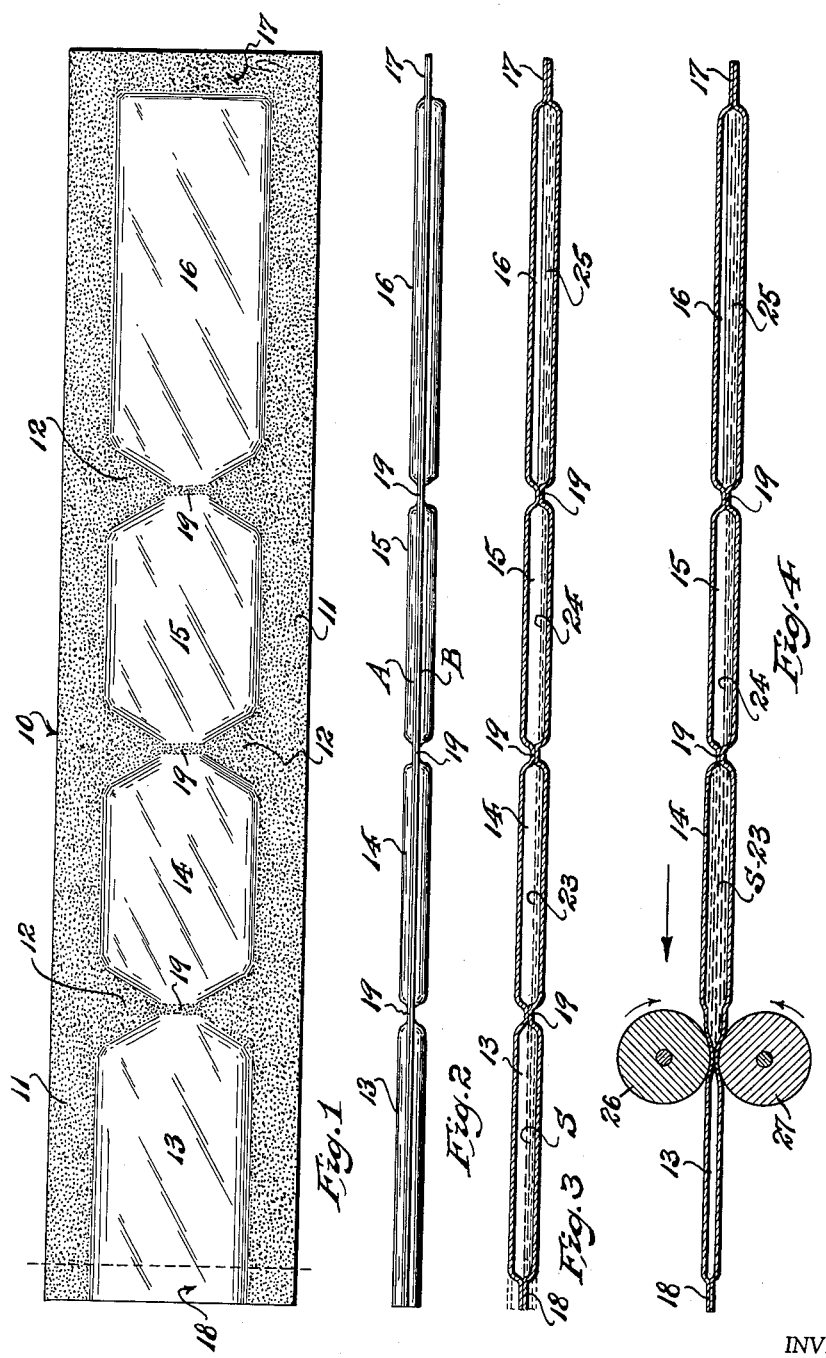
INVENTOR.
Jasper A. Forestiere,
BY Richards and Cifelli,
Attorneys May 29, 1962 J. A. FORESTIERE 3,036,894
METHOD OF USING TESTING CONTAINERS
Filed Oct. 22, 1958 3 Sheets-Sheet 2
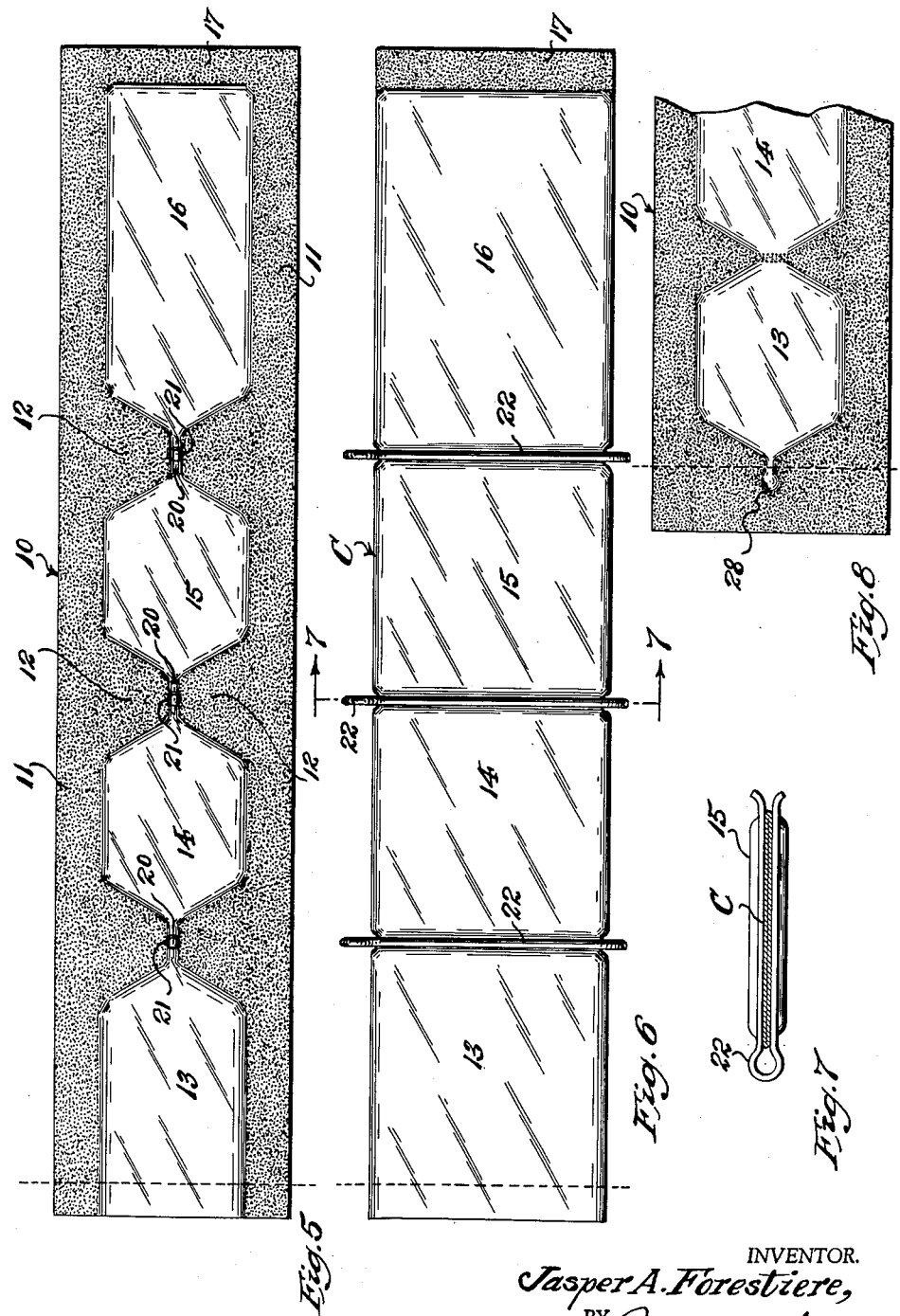
INVENTOR.
Jasper A. Forestiere,
BY Richard V. Cifelli,
Attorneys May 29, 1962 J. A. FORESTIERE 3,036,894
METHOD OF USING TESTING CONTAINERS
Filed Oct. 22, 1958 3 Sheets-Sheet 3
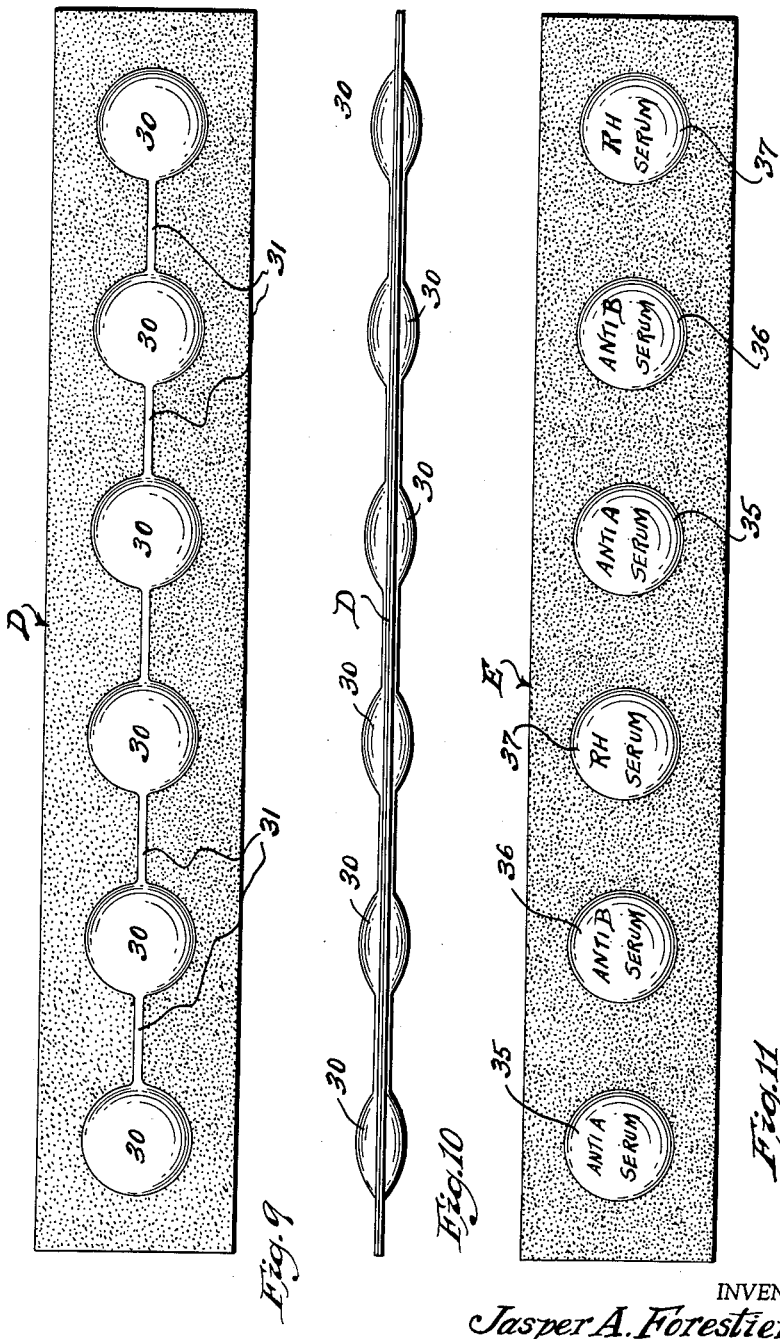
INVENTOR.
Jasper A. Forestiere,
BY Richards & Cifelli,
Attorneys United States Patent Office 3,036,894
Patented May 29, 1962

3,036,894
METHOD OF USING TESTING CONTAINERS
Jasper A. Forestiere, 15 Treadwell Ave., Madison, N.J.
Filed Oct. 22, 1958, Ser. No. 768,993
7 Claims. (Cl. 23—230)

This invention relates to testing containers and methods of using the same, whereby chemical reactions between a substance to be tested and one or more testing reagents can be progressively accomplished within a closed system, provided by the testing container, to a desired end point, and so that a given testing procedure can be easily and quickly carried out, even by one without technical training.

This invention has for an object to provide novel testing containers and methods of using the same, whereby the testing container comprises a substantially tubular body of flexible or pliable material, preferably but not necessarily of transparent or translucent character, said body being divided into a succession of non-communicating individual compartments or chambers adapted to contain predetermined amounts of testing reagents with which a substance to be tested can be caused to react.

This invention has for a further object to provide a testing container and method of using the same, the flexible or pliable tubular body of said container being divided into a succession of initially non-communicating individual compartments or chambers, said compartments or chambers being separated one from another by separating or sealing means which, by manipulation of the container, can be opened to permit transfer of the content of a preceding compartment or chamber to a succeeding compartment or chamber. The successive compartments or chambers of the testing container may comprise a first compartment or chamber to receive and contain a substance to be tested, and respective succeeding compartments or chambers are adapted to be charged to initially contain predetermined amounts of appropriate testing reagents, measured by weight, volume or concentration; said reagents being arranged in such order that a desired chain of successive intermixing of the substance to be tested therewith and resultant reaction therewith can be progressively carried on and consummated to a desired end point within the closed testing container. The transfer of the substance to be tested and the intermixture thereof with the reagents being accomplished by successively exerting, either manually or mechanically, squeezing pressure upon a preceding compartment or chamber, whereby the pressure of the content of the preceding compartment or chamber will force open the separating or sealing means between said preceding compartment or chamber and a succeeding compartment or chamber, so as to permit entrance of the content of the preceding into the succeeding compartment or chamber for intermixture and reaction with the content of the latter.

Other objects of this invention, not at this time more particularly mentioned, will be understood from a reading of the following description of illustrative embodiments of this invention in connection with the accompanying drawings by which said embodiments are shown, in which drawings:

FIG. 1 is a plan view of one form of the testing container according to this invention;

FIG. 2 is an elevational edge view thereof;

FIG. 3 is a central longitudinal sectional view therethrough; and

FIG. 4 is a like central longitudinal sectoinal view, showing one method of manipulating the testing container to carry out a testing procedure.

FIG. 5 is a plan view of a modified form of the testing container.

FIG. 6 is a plan view of another modified form of the testing container; and

FIG. 7 is a cross-sectional view of the same, taken on line 7—7 in FIG. 6.

FIG. 8 is a fragmentary plan view of a further modified form of the testing container.

FIG. 9 is a plan view of another form of the testing container; and

FIG. 10 is an elevational edge view of the same.

FIG. 11 is a plan view of still another form of the testing container according to this invention.

Like characters of reference are employed in the hereinabove described figures of the drawings, to indicate corresponding parts.

Referring to the drawings, and more particularly to FIGS. 1 to 4 inclusive, the reference character 10 indicates one form of the testing container according to this invention. This form of testing container may comprise superimposed strips A and B of suitable length and width produced from flexible or pliable material, such e.g. as a polyethylene or like plastic material. These superimposed strips A and B are joined along longitudinal marginal areas 11 and inwardly extending areas 12 by heat sealing or adhesively uniting the same, whereby to provide a longitudinally extending series of compartments or chambers, in number accordingly as required to successively accommodate the substance to be tested and the number of testing reagents with which the substance is to be reacted in the test procedure. Illustratively, as shown, the compartments or chambers comprise a first compartment or chamber 13 to receive the substance to be tested, successive compartments or chambers 14 and 15 to contain testing reagents, and a final compartment or chamber 16 to receive the tested substance. Said final compartment or chamber is closed at its outer end by heat sealing or adhesively joining end marginal portions of the strips A and B to form a closed end 17.

It will be understood that the reagent containing compartments or chambers may be decreased or increased in number according to the requirement of submission of the substance to be tested to one or more testing reagents. Generally, the receiving compartment or chamber 13 is initially open at its outer end to permit introduction thereinto of the substance to be tested. After such introduction, said outer end of the receiving compartment or chamber 13 can be closed by heat sealing or adhesively uniting the outer marginal portions of the strips A and B in the end zone 18 defined by the transverse broken line shown in FIG. 1.

Adjoining compartments or chambers of the testing container body are initially closed against intercommunication by separating or sealing means of such character as to open under application thereto of internal pressure. The separating or sealing means may comprise narrow transverse heat sealed or adhesive jointure 19 of relatively small area, as shown in FIG. 1, which, by reason of its small area, is readily yieldable to applied internal pressure, whereby to open communication between the adjoined compartments or chambers during operative manipulation of the testing container in the course of testing procedure as hereinafter set forth.

Another means for initially closing communication between adjoining compartments or chambers of the testing container is shown in FIG. 5, and comprises a longitudinal passage 20 extending between opposed ends of adjoining compartments or chambers. Lodged in the passage 20 is a movable valve piece 21, such e.g. as a ball. Under the force of pressure applied to fluid in one compartment or chamber, the valve piece or ball 21, will be moved out of the passage 20, whereby to admit flow of the fluid from said compartment or chamber into the adjoining compartment or chamber.

Another modified form of testing container is shown in FIGS. 6 and 7, the same comprising a tubular body C of suitable length and width, and also formed from flexible or pliable material, such as polyethylene or like plastic materal. Said tubular body C is divided intermediate its ends into a series of initially non-communicating compartments or chambers, to provide e.g. a receiving compartment or chamber 13, reagent containing compartments or chambers 14 and 15, and a final compartment or chamber 16. The means for defining and initially separating these compartments or chambers comprise U-shaped spring clamp members 22, which are disposed to transversely straddle the tubular body, and thus hold closed together opposite walls of the latter between said compartments or chambers. Being made of springy material, the legs of these clamp members will tend to open out and separate under application of internal pressure, thus permitting the closed together walls of the tubular body to separate and thereby open communication between adjoining compartments or chambers. If desired however the clamp member intermediate adjoined compartments or chambers can be temporarily removed from the tubular body to permit fluid from one compartment or chamber to pass therefrom into the adjoining compartment or chamber, whereafter the clamp member can be replaced. Instead of sealing the open ends of the tubular body C, clamp members 22 can be applied to said ends to close the same.

The testing containers of this invention are adapted to be preproduced to accommodate the same, when put to use, to given testing procedures. If, for example, it is desired to submit a substance to be tested to reaction with one or more testing reagents, appropriate reagents, in predetermined appropriate amounts, are deposited in selected compartments or chambers during make up of the testing container to be used. For example, as shown in FIGS. 1 to 6, assume that the substance to be tested is to be progressively submitted to the reaction therewith of two selected reagents. In such case, a measured amount of a first reagent 23 is enclosed in the compartment or chamber 14, a measured amount of the second reagent 24 is enclosed in the compartment 15. If desired a measured amount of a diluent 25, e.g. distilled water, can be enclosed in the final compartment or chamber 16 (see FIG. 3).

The testing container, as thus precharged, is ready for use. In such use, a predetermined amount of substance S to be tested is introduced into the receiving compartment or chamber 13, which is then closed. The testing container is now ready for subjection to the testing procedure. In carrying out said procedure, the receiving chamber is subjected to pressure, either manually or mechanically applied; if mechanically, the pressure is applied by advancing the receiving compartment or chamber 13 through means adapted to apply squeezing pressure thereto, such e.g. as squeeze rollers 26—27 (see FIG. 4). As the compartment or chamber 13 is thus progressively squeezed, in direction from its outer end toward its inner end, its content of substance S to be tested is forced toward the yieldable or permeable separating or sealing means 19, 21 or 22, as the case may be, thereby exerting internal pressure against the separating or sealing means which opens the same to passage of the substance S to be tested into the compartment or chamber 14 for mixture thereof with the reagent 23 contained in the latter for reaction of said reagent therewith. If the reaction thus occurring in chamber 14 requires thermal treatment, either by heat or cold, the portion of the testing container comprising the compartment or chamber 14 can be submitted to the effect of elevated temperature, as by dipping the same in a hot water bath, or to the action of low temperature by dipping the same in a cold water bath, or by any other suitable thermal treatment. After an interval permitting reaction of the substance S to be tested with the reagent 23 in compartment or chamber 14 elapses, the compartment or chamber 14 is in turn subjected to squeezing pressure, whereby to advance its contained reacted mixture, with opening pressure effect upon the separating or sealing means intermediate said compartment or chamber and the next compartment or chamber 15, whereby to pass the content of the former into the latter, therein to intermix and react with the contained reagent 24. Here again thermal treatment may be applied if required. This having been accomplished, the resultant reacted content of compartment or chamber 15 can, by similar application of squeezing pressure, passed into the final compartment or chamber 16, whereafter said final chamber can be opened and the now tested substance removed for test reading and conclusion in any suitable manner, as e.g. by reading in a photometer, in a colorimeter or otherwise as may be appropriate.

Instead of introducing the substance to be tested into a separate open receiving compartment or chamber, especially when submission to a plurality of successive reagents is intended, the first compartment or chamber of the testing container may be charged with a reagent content and closed, whereupon the required amount of substance to be tested can be introduced thereinto by hypodermic syringe injection. To facilitate such method of introduction, the first compartment or chamber 13 is formed to provide a small vestibule chamber 28 which communiduction, the needle perforation can be closed by heatsealcates therewith (see FIG. 8). The wall of this vestibule chamber can be pierced by the hypodermic needle for admission of the substance to be tested, and after the needle is withdrawn upon completion of substance introduction, the needle perforation can be closed by heat sealing together opposite walls of the vestibule chamber, or by patching the perforation.

The testing container and method of using the same can be easily varied and adapted for use with respect to various particular test procedures, when chemical reactions of selected reagent or reagents with the substance to be tested is required to indicate an unknown characteristic or condition of the latter.

The following specific examples are illustrative of the method procedure and use of the testing container.

EXAMPLE I

*Examination of Blood for Sugar Content*

A testing container of a type above described is provided, and enclosed within the first reagent compartment or chamber is a measured amount (e.g. 2 ml.) of copper sulphate; enclosed within the second reagent compartment or chamber is a measured amount (e.g. 2 ml.) of phosphomolybdic acid; the final compartment or chamber containing a predetermined amount of distilled water.

A blood filtrate is prepared by deproteinizing oxalated blood with sulphuric acid and tungstic acid. Two ml. of this blood filtrate is introduced into the receiving compartment or chamber of the testing container; this compartment or chamber being thereupon closed, whereupon the testing container is ready for test procedure.

First, by squeezing pressure applied to the receiving compartment or chamber, the contained blood filtrate is forced toward the first reagent compartment or chamber, whereby to open the intermediate separating or sealing means, and thereupon pass the blood filtrate into said reagent compartment or chamber so as to intermix with the copper sulphate reagent contained therein.

Next, this having been done, the testing container is submerged in a warm water bath of suitable temperature for six minutes, and then removed and submerged in a cold water bath for three minutes.

Next, by squeezing pressure applied to the first reagent compartment or chamber, the mixture contained therein is transferred to the second reagent compartment or chamber, therein to be thoroughly mixed with the phosphomolybdic acid reagent (which takes about three minutes).

Finally, the thus reacted mixture is forced from the second reagent compartment or chamber into the final compartment or chamber to mingle with the distilled water content of the latter. The final compartment or chamber can now be opened and reacted blood filtrate can be removed and read in a photometer for sugar indication, which should be done within ten minutes after mixture with the distilled water.

EXAMPLE II

Examination of Blood by Macro Blood Sugar Test

As in Example I, a measured amount (1 ml.) of copper sulphate reagent is enclosed in the first reagent compartment or chamber of a testing container; a measured quantity (2 ml.) of phosphomolybdic acid reagent is enclosed in the second reagent compartment or chamber of the testing container; and a predetermined amount (3 ml.) of distilled water is enclosed in the final compartment or chamber of the testing container.

To prepare for test, to 0.1 ml. of blood serum add 1.9 ml. of tungstic acid, then mix well and centrifuge.

Introduce 1 ml. aliquot of the supernatant into the receiving compartment or chamber of a testing container, and then close said compartment or chamber.

By compression force the aliquot to pass from the receiving compartment or chamber into the first reagent compartment or chamber to mix with the copper sulphate reagent therein. Then submerge the testing container in a hot water bath (about 100° C. in temperature) for ten minutes, and then remove and cool in an ice water bath. Thereafter, by compression, pass the mixture from the first reagent compartment or chamber into the second reagent compartment or chamber to therein intermix with the contained phosphomolybic acid reagent. After allowing to stand about three minutes, by compression, pass the thus reacted mixture into the final compartment or chamber to mingle with the distilled water therein, and thereafter be removed therefrom for reading in a colorimeter for sugar indication.

EXAMPLE III

Blood Urea Determination

The testing container is prepared by enclosing in the first reagent compartment or chamber thereof a measured amount (.2 ml.) of diacetyl monoxime solution, and in the second reagent compartment or chamber a measured amount (.8 ml.) of sulphuric-phosphoric acid.

To prepare for test, 0.5 ml. of blood serum is mixed with 1 ml. of water, and 2 ml. of tungstic acid is then added, and the resultant preparation thereupon mixed and centrifuged.

A 1 ml. aliquot of the blood serum preparation is introduced into the receiving compartment or chamber of the testing container, and said compartment or chamber is then closed.

By compression, force this aliquot to pass from said receiving compartment or chamber into the first reagent compartment or chamber to mix with the diacetyl monoxime solution therein. Thereafter, by compresssion, force the resultant mixture to pass into the second reagent compartment or chamber to mix with the contained sulphuric-phosphoric acid reagent. Finally, force the reacted mixture into the final compartment or chamber of the testing container, and then heat this compartment or chamber in hot water (100° C. temperature) bath for thirty minutes, and thereafter remove and read the mixture in a colorimeter with 44 filter.

It may here be pointed out that the contents of the reagent compartments or chambers of the testing container can be identified in connection therewith by printing the designations thereof on the respective reagent compartment or chamber portions of the testing container; and also any required treatment of the testing container in carrying out procedural use thereof, such e.g. as thermal treatment, may be indicated by instructional information likewise printed on appropriate portions of the testing container.

Although the above examples relate to use of the testing containers when employed for blood examination, it will be understood that the use of the testing containers is not limited to such specific purpose, but that the same may be used for many other examinations of substances in the medical field, and may also be used in many different fields where chemical reaction between two or more chemicals can be advantageously carried out in sequential steps in a closed system which the testing containers according to this invention provide.

The testing container can be modified, within the scope and principles of this invention, to adapt the same for particular use and procedure, such as conducting titration within the closed system provided by the testing container. A modified form of testing container adapted for titration is shown in FIGS. 9 and 10, and comprises a substantially tubular body D formed to provide a succession of compartments or chambers 30 connected by communicating channels or passages 31. These channels or passages, if of small cross-sectional area, may be open, or, if desired, may be initially closed by disruptable separating or sealing means similar to that already hereinabove described.

In titrating in the closed system provided by this modified form of testing container, by introducing the substance to be titered into the first compartment or chamber, the substance can be mixed with a diluent, and then progressively advanced, by application of squeezing pressure, to succeeding compartments or chambers, all of which are initially supplied with and contain like predetermined volumes of diluent. With a known volume of substance to be titered, one half of the volume from each preceding compartment or chamber can be forced into an adjacent succeeding compartment or chamber, therein to be mixed with its contained diluent. To determine such successive half volumes, the means for applying squeezing pressure can be so arranged that only sufficient squeezing pressure is applied at each transfer step as will assure no more than the desired half volume of the titered substance will be passed from respective preceding compartments or chambers to a succeeding compartment or chamber. The means for applying the predetermined necessary squeezing pressure may comprise pairs of variably spaced squeezing rolls (such as 26—27 previously described), or slotted dies (not shown) of various aperture size may be utilized between respective adjoining compartments or chambers.

The testing container according to this invention can also be modified to adapt the same for use in blood typing. A testing container so modified is shown in FIG. 11 and comprises a body E formed to provide groups of separate individual compartments or chambers; each group comprising a plurality of compartments or chambers respectively indicated by the reference characters 35, 36 and 37 in said FIG. 11. The compartment or chamber 35 is initially supplied with a predetermined amount of anti A serum, compartment or chamber 36 with a predetermined amount of anti B serum, and compartment or chamber 37 with a predetermined amount of Rh serum.

Preparatory to use of the testing container for blood typing, a 2 percent cell suspension of red cells of blood to be typed in 0.9 percent sodium chloride is prepared. This cell suspension is aspirated into a tuberculin syringe.

In use, .05 ml. of the cell suspension is injected into a compartment or chamber 35 containing anti A serum. With a clean needle inject a like amount of the cell suspension into a compartment or chamber 36 containing the anti B serum, and similarly a like amount of the cell suspension is injected into a compartment or chamber containing Rh serum. After thoroughly mixing the substances within the respective chambers, the substances can be observed for agglutination, and then, after standing at room temperature for one hour, can be read for blood type indication.

While there have been described illustrative embodiments of this invention and mode of use thereof, it will be obvious that various changes and further modifications may be made therein without departing from the invention as defined in the here following claims.

What is claimed is:

1. A method of examining a selected substance in a closed system provided by a hollow body of suitable length and width formed from impervious pliable sheet material and internally divided to provide a series of spaced apart closed chambers with selected testing substance enclosed in selected chambers, and means of communication between said chambers, said method comprising introducing the substance to be examined in a first chamber, and then, by application of squeezing pressure upon said first chamber and successively upon succeeding chambers, transferring at least part of the substance to be examined from one chamber to another.

2. A method of examining a selected substance for an unknown characteristic thereof in a closed system provided by a hollow body of suitable length and width formed from impervious pliable sheet material and internally divided to provide a succession of chambers with selected reagents enclosed in selected chambers, said body having normally closed means of communication between adjacent chambers, said method comprising introducing the substance to be examined into a first chamber and then closing this chamber, and then, by application of squeezing pressure upon said chamber and succeeding chambers, forcing the substance progressively from one to the other thereof.

3. A method of examining a selected substance for an unknown characteristic thereof in a closed system provided by a hollow body of suitable length and width formed from impervious pliable sheet material and internally divided to provide a succession of chambers with selected reagents enclosed in selected chambers, said body having normally closed means of communication between adjacent chambers, said method comprising introducing the substance to be examined into a first chamber and then closing this chamber, then by application of squeezing pressure upon said first chamber forcing said substance into a next adjacent chamber for mixture with the reagent therein, and then, by application of squeezing pressure successively upon the latter chamber and succeeding chambers, forcing the substance progressively from one to the other thereof and thence into a final chamber from which said substance can be removed for application to reading means adapted to indicate the sought characteristic of the substance examined.

4. A method of examining a selected test substance in a closed system comprising introducing a test sample into a first chamber of a series of chambers, the succeeding chambers being formed by hollows in a pliable body and at least some of said chambers containing selected reagents, and thereafter transferring at least part of said test sample serially into succeeding chambers to effect contact of the test sample with the reagents in said chambers by applying force to said body in the vicinity of the chamber in which the test sample is located in order to displace at least part of the test sample into the next succeeding chamber.

5. The method as set forth in claim 4 wherein there is provided between the chambers communication means through which the test sample is displaced upon said application of force.

6. The method as set forth in claim 4 wherein there is provided between the chambers closed communication means and wherein the said communication means are opened to enable the test sample to be displaced therethrough upon the application of said force.

7. The method as set forth in claim 4 wherein there is provided between the chambers jointure areas which are readily openable by applied internal pressure and wherein the said application of force to displace the test sample causes the said jointure areas to be opened by the test sample.

References Cited in the file of this patent

UNITED STATES PATENTS

| | | |
|---|---|---|
| 1,983,681 | Siever | Dec. 11, 1934 |
| 2,069,333 | Salfisberg | Feb. 2, 1937 |
| 2,487,077 | Shepherd | Nov. 8, 1949 |
| 2,508,197 | Singer | May 16, 1950 |
| 2,534,229 | Carhart | Dec. 19, 1950 |
| 2,575,467 | Reichel | Nov. 20, 1951 |
| 2,770,601 | Weichselbaum | Nov. 13, 1956 |
| 2,785,057 | Schwab | Mar. 12, 1957 |